US010560365B1

(12) United States Patent
Losito

(10) Patent No.: US 10,560,365 B1
(45) Date of Patent: Feb. 11, 2020

(54) DETECTION OF MULTIPLE SIGNAL ANOMALIES USING ZONE-BASED VALUE DETERMINATION

(71) Applicant: Amazon Technologies, Inc., Seattle, WA (US)

(72) Inventor: Marco Losito, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 15/716,219

(22) Filed: Sep. 26, 2017

(51) Int. Cl.
*G06F 15/173* (2006.01)
*H04L 12/26* (2006.01)

(52) U.S. Cl.
CPC .............. *H04L 43/50* (2013.01); *H04L 43/08* (2013.01); *H04L 43/12* (2013.01); *H04L 43/16* (2013.01)

(58) Field of Classification Search
CPC ......... H04L 43/50; H04L 43/08; H04L 43/12; H04L 43/16
USPC ........................................................ 709/224
See application file for complete search history.

*Primary Examiner* — Wing F Chan
*Assistant Examiner* — Joseph R Maniwang
(74) *Attorney, Agent, or Firm* — Davis Wright Tremaine LLP

(57) ABSTRACT

Techniques for detecting a predetermined waveform pattern in a signal received at a system are disclosed herein. A standard deviation and an average of the signal are calculated and used to determine a plurality of zones for the signal. A plurality of samples is obtained from the signal and one of the zones is associated with each of the samples. Transitions of the signal between the zones are identified based on the association of the zones with the samples. A predetermined waveform pattern may be detected in the signal based on the transitions between the zones. A notification may be generated indicating that the predetermined waveform pattern is detected based on a correspondence of the transitions of the signal matching a set of the predetermined transitions.

20 Claims, 11 Drawing Sheets

DETECTION OF MULTIPLE SIGNAL ANOMALIES USING ZONE-BASED VALUE DETERMINATION

BACKGROUND

Modern systems receive and process electrical signals in fulfillment of their routine activities. The systems may be sensitive to receiving signals comprising anomalous waveform patterns. For instance, receiving a signal having a series of spikes comprising a number of the spikes that occur over a relatively short period of time may adversely affect the performance of some systems. However, detecting the series of spikes in the signal in real-time is a difficult problem. Some systems may generate a false positive for detection of a spike based on receiving a signal having a step-function shape. Moreover, receiving a signal having a step-function shape may be acceptable in some systems, and therefore may cause inefficiencies in the system based on the detection of false positives.

BRIEF DESCRIPTION OF THE DRAWINGS

Various techniques will be described with reference to the drawings, in which.

DETAILED DESCRIPTION

Figure 1:
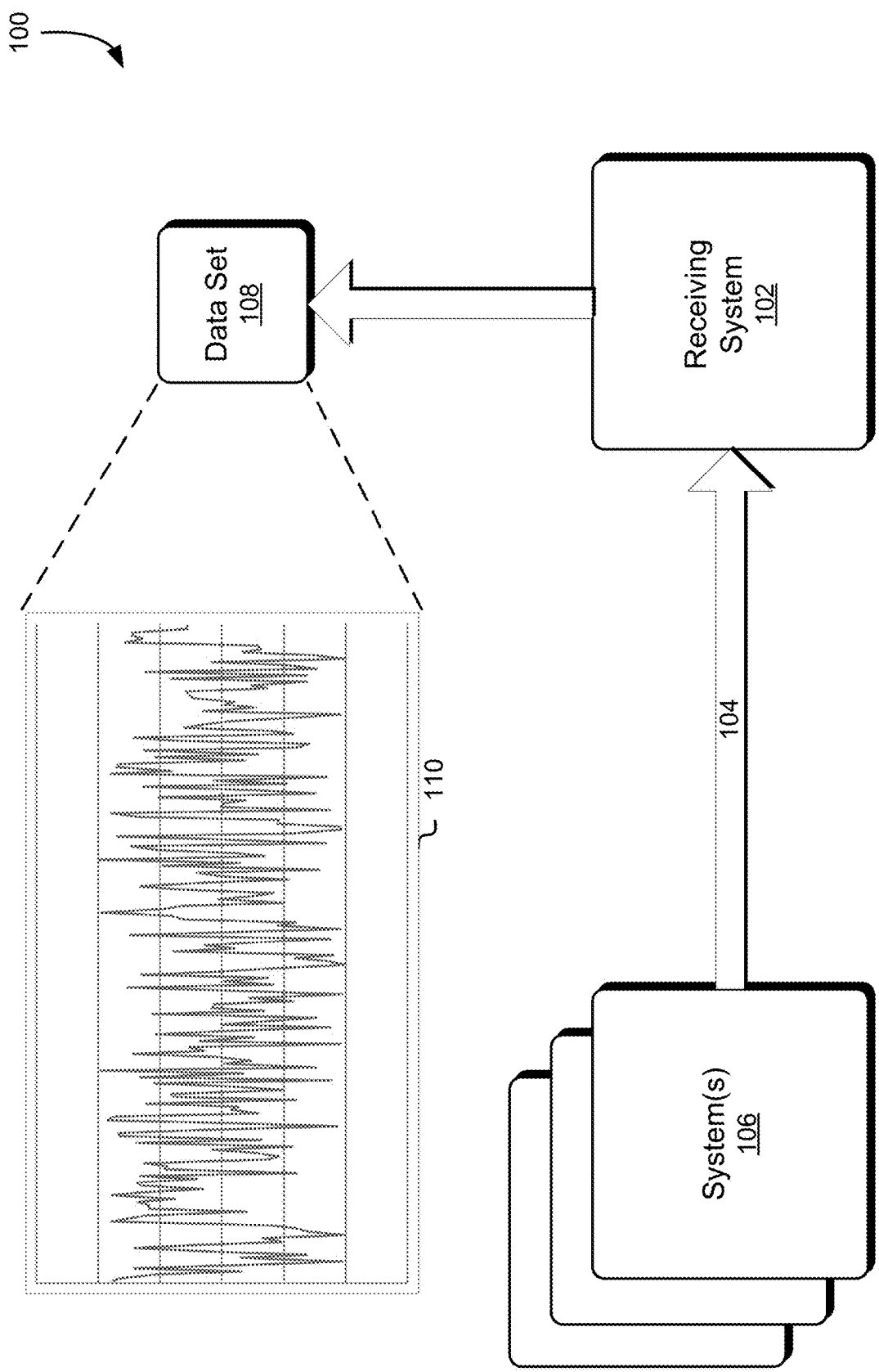
FIG. 1 illustrates an environment in which various embodiments may be practiced.

Techniques described and suggested herein include methods and systems for detecting a predetermined waveform pattern in a received signal. A set of zones for the signal may be determined using a set of statistical values calculated based on the signal. Samples obtained from the signal may be analyzed to determine in which of the zones the samples are located. A zone determined for a sample may be compared with a second zone determined for a previous sample, and a transition of zones for the signal may be determined based on the second zone and the first zone. The transition of zones may be compared with a set of predetermined transitions that are indicative of a waveform pattern being detected. If the transition matches one of the set of predetermined transitions, the transition corresponding to the sample and the previous sample is determined as potentially being a segment of the waveform pattern.

In one example, a transition counter is implemented to maintain a count for the number of transitions identified as matching one of the set of predetermined transitions. The counter may, for instance, be updated for each transition that corresponds to a segment of the waveform pattern. The transition counter may be reset to an initial value if a transition is identified as being a mismatch to the set of predetermined transitions. That is, a transition for the signal that does not correspond to one of the predetermined transitions breaks the trend of the waveform pattern, and the transition counter is accordingly reset. In response to the transition counter reaching or exceeding a predetermined value, a waveform counter may be updated to indicate that a waveform pattern has been detected. The waveform counter may be used to detect a series of waveform patterns that are determined as adversely affecting the system. The waveform counter is compared with a predetermined threshold corresponding to the number of occurrences of the waveform patterns in the series of waveform patterns. If a transition for the signal is determined as being a mismatch to the set of predetermined transitions, the waveform counter may be reset. If the waveform counter is determined as reaching or exceeding the predetermined threshold, the system may cause a response to be issued. For example, a condition in a computing network can be remedied.

A second set of predetermined transitions may be used to identify transitions for which the system is in an intermediate state, and needs additional time to return to a normal state. A second transition counter may be implemented that counts the number of transitions that match one of the second set of predetermined transitions. If the second transition counter exceeds a predetermined threshold associated with the second set of predetermined transitions, the counters may be reset to indicate that the waveform pattern was not detected. However, if the transition for the signal matches one of the second set of predetermined transitions, the counter values are maintained and the system continues analyzing samples. The predetermined thresholds associated with the transition counter and the second transition counter may be determined according to time information associated with the system, such as a sample rate of the system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 in which a receiving system 102 receives signals 104 from one or more systems 106. The signal 104 may comprise one or more separate signals transmitted from each of the systems 106. The signals 104 may be measured to obtain a data set 108 indicating one or more characteristics of the signals 104. One or more characteristics from the data set 108 may be monitored to obtain a representation 110 showing a progression of the respective characteristic over time. The signal 104 is a collection of electrical signals provided to the receiving system 102 to help the receiving system 102 perform a function.

In one embodiment, the receiving system 102 may be a computing resources service provider that may provide an environment within which one or more applications, processes, services, virtual machines, and/or other such computer system entities may be executed to provide one or more computing resources to users. A computer system, as referred to herein, is a system that can be implemented using hardware and software. A computer system may comprise one or more separate computing devices (e.g., servers, personal computing machine, virtual machine) including a processor and data storage. The user may be a person, or may be a process running on one or more remote computer systems, or may be some other computer system entity, user, or process. The systems 106 may be internet service provider ("ISP") entities that provide services for accessing and using the internet, and the signal 104 may correspond to one or more network communication signals provided by the systems for exchanging data with users over the internet. The representation 110 may show a progression of one or more characteristics of the network communication signals over time. For example, the representation 110 may show the progression of a data rate for the network communication signals provided to the computing resources service provider over time. As discussed below in greater detail, a waveform having a specific pattern in the data rate provided by one or more of the ISPs may indicate an anomaly that affects the performance of the service provider. Detecting the pattern in real-time may enable the service provider to respond to the anomaly before the anomaly adversely affects the service provider's performance.

The following description is provided with reference to the computing resources service provider; however, those of ordinary skill in the art will appreciate that the techniques described herein are applicable to signals 104 received by a receiving system 102 other than a service provider. In one embodiment, the systems 106 may be one or more utilities providing electrical power to the receiving system 102, and the signals 104 may correspond to electrical power provided to the receiving system 102 by the systems 106. The representation 110 may correspond to the amplitude of the power provided to the receiving system 102. As another example, the receiving system 102 may be a testing system configured to measure one or more aspects of the systems 106, and the representation 110 may correspond to a collection of data obtained during testing of the systems 106. In general, the techniques disclosed and suggested herein are applicable to real-time detection of a specific pattern in a numeric signal provided in a linear time and constant space domain.

Figure 2:
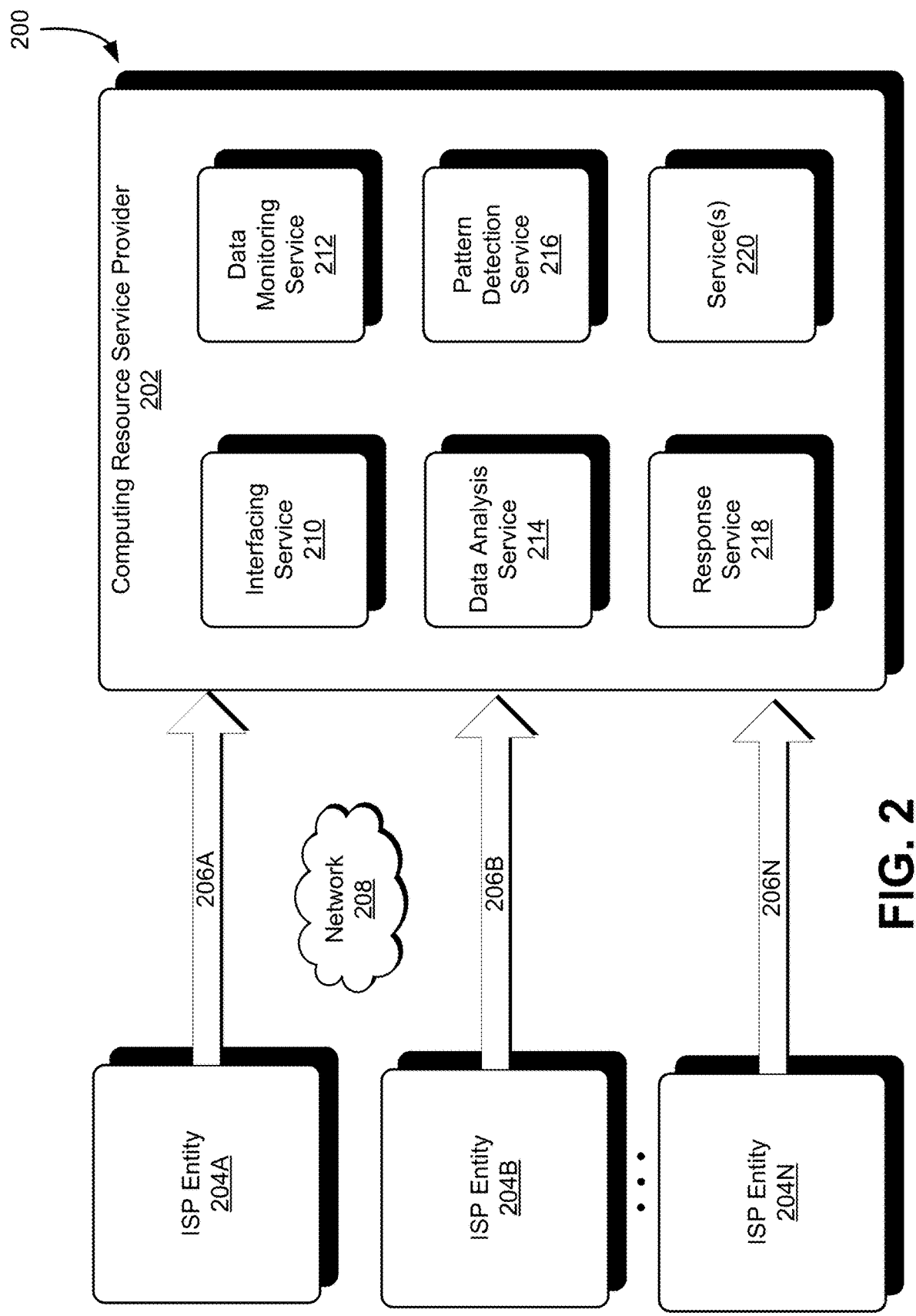
FIG. 2 illustrates a second environment in which various embodiments may be practiced.

FIG. 2 shows an environment 200 in which a computing resources service provider 202 receives a plurality of data streams 206 from a plurality of ISP entities 204 over a network 208. The service provider 202 may comprise a service provider entity, such as a datacenter, that provides services to users in a geographic region. The ISP entities 204 may each correspond to a collection of internet service provider computer systems, respectively representing an ISP company, that are configured to provide internet access to users, and act as an intermediary to convey data streams 206 between the users and the service provider 202 over the network 208. The data streams 206 may include data relating to provisioning of services to the users by the service provider 202.

The service provider 202 may comprise or provide one or more services depicted, including an interfacing service 210, a data monitoring service 212, a data analysis service 214, a pattern detection service 216, a response service 218, and service(s) 220. The services may each comprise a computer system including executable programming code running or executing on one or more computing devices or resources (e.g., servers, personal computers, virtual machines) of or for the service provider 202. Some or all of the services may be implemented by a single computing device. Although the services herein are described as being separate services, those of skill in the art will appreciate that two or more of the services may be implemented to operate as a single service of the service provider 202. The service(s) 220 of the service provider include one or more services related to performance of cryptographic services, authentication services, data storage services, compute capacity services (e.g., virtual machine provision), or electronic commerce services, by way of non-limiting example. The data streams 206 may include data corresponding to user requests to provide one or more of the service(s) 220 to a user, and may include data corresponding to fulfillment of the user requests by one or more of the service(s) 220.

The interfacing service 210 may be a computer system configured to interface with the ISP entities 204 to send and receive data over the network 208. The interfacing service 210 may, for instance, comprise one or more processors and memory that stores executable instructions whose execution by the one or more processors causes the interfacing service to perform operations described herein. The interfacing service 210 may also be configured to act as an intermediary and direct data received to one or more of the other services of the service provider 202. The interfacing service 210 may route data corresponding to requests for services received in the data 206 to appropriate ones of the service(s) 220 and may route data from the service(s) 220 to an appropriate ISP entity 204.

The data monitoring service 212 may be a computer system configured to monitor the one or more of the data streams 206A through 206N and provide information regarding one or more aspects of the data streams 206. The monitoring service 212 may, for instance, comprise one or more processors and memory that stores executable instructions whose execution by the one or more processors causes the monitoring service to perform operations described herein. In one embodiment, the data monitoring service 212 may include a means for monitoring the one or more data streams and providing information regarding the one or more aspects of the data streams. The means of the data monitoring service 212 may comprise one or more processors and memory that stores executable instruction whose execution by the one or more processors to perform the operations described herein, such as the subject matter described below with respect to FIGS. 3 and 4.

The data monitoring service 212 may periodically sample the one or more data streams 206A through 206N to determine a data point characterizing the aspect of the one or more data streams 206A through 206N at a given point in time. One aspect of the data stream may be a data rate of data received and/or sent over one of the data streams 206. In one embodiment, for example, the monitoring service 212 may monitor the data streams 206, determine the data rate for network traffic received in the data stream 206A from the ISP entity 204A (e.g., inbound network traffic from ISP 204A), and provide information regarding the data rate. Another aspect may be the data rate for network traffic related to one of the service(s) 220. For instance, the monitoring service 212 may determine the amount of data in the data streams 206A through 206N directed to one of the services 220 (e.g., electronic commerce service), and provide information regarding the amount of data directed to the service. The monitoring service 212 may refine or analyze the information to provide more in-depth information, such as the amount of traffic directed to a particular webpage of the electronic commerce service. The monitoring service 212 may provide the information regarding the aspect as a stream of data points representing information for the aspect. An example of the stream of data points, as referred to herein, may be a numeric time-series signal.

The data analysis service 214 may be a computer system configured to analyze the information regarding the aspect of the one or more data streams 206A through 206N provided by the monitoring service 212, and generate information regarding the information received. The analysis service 214 may, for instance, comprise one or more processors and memory that stores executable instructions whose execution by the one or more processors causes the analysis service 214 to perform operations described herein. In one embodiment, the data analysis service 214 may include a means for determining a set of statistical values based on a set of samples of a signal received at a system, and analyzing information regarding the aspect of the one or more data streams. The data analysis service 214 may also include a means for defining the plurality of zones using a set of values corresponding to the set of samples obtained. The means may comprise one or more processors and memory coupled to the one or more processors that stores executable instruction whose execution by the one or more processors to perform the operations described herein, such as subject matter described below with respect to FIGS. 4 and 5.

The analysis service 214 may collect data regarding the aspect of the data streams 206A through 206N and generate statistical data based thereon. For instance, the analysis service 214 may generate a set of statistical values of the aspect of the one or more data streams 206A through 206N. The set of statistical values, as referred to herein, may comprise a set of values comprising a standard deviation and an average—in this case, a standard deviation and an average of the one or more data streams 206A through 206N. The set of statistical values may include other statistical indicators, such as a mean value or a median value. The analysis service 214 may also generate information defining zones of values for the aspect of the one or more data streams 206A through 206N. The zones may include a normal zone of the aspect and one or more other zones characterizing a status of the aspect of the one or more data streams 206A through 206N relative to the normal zone. Information for each zone may include a value identifying an upper boundary and a lower boundary for the zone, and the upper and lower boundaries may be mutually exclusive to the upper and lower boundaries for the other zones. The information defining the zones of values may be generated based at least in part on the set of statistical values (e.g., average, standard deviation) of the aspect. The analysis service 214 may also calculate the zones using a set of constant values for the aspect, as described in further detail below. The analysis service 214 may determine which zone a sample received from the monitoring service is associated with, and provide an indication of the zone associated with the sample.

The pattern detection service 216 may be a computer system configured to determine whether a set of samples for the aspect of the data streams 206 corresponds to a series of a predetermined waveform patterns. The detection service 216 may, for instance, comprise one or more processors and memory that stores executable instructions whose execution by the one or more processors causes the detection service 216 to perform operations described herein. In one embodiment, the pattern detection service 216 may include a means for determining a set of zone locations corresponding to a plurality of predetermined transitions for detecting a predetermined waveform pattern in a signal received at the system. The means of the pattern detection service 216 may comprise one or more processors and memory coupled to the one or more processors that stores executable instruction whose execution by the one or more processors to perform the operations described herein, such as subject matter described below with respect to FIG. 6.

In one embodiment described below, for example, the detection service 216 may be configured to detect a series of spikes in the numeric signal corresponding to the aspect of the data streams 206. The detection service 216 may be configured to detect one or more characteristics of the pattern based on whether a change in the numeric signal is indicative of the pattern. The detection service 216 may include information specifying zone changes in the numeric signal that, if observed in the numeric signal, are useable identify segments of the waveform pattern. The pattern detection service 216 may determine a numeric signal change based on a zone associated with a first value for the aspect, such as a current value, and a zone associated with the second value for the aspect, such as a previous value. If the detection service 216 determines that the signal change corresponds to a signal change indicative of a segment of the waveform pattern, the detection service 216 may update information indicating that one of the segments of the waveform pattern was observed in the numeric signal.

The pattern detection service 216 may maintain information over time that is useable to identify a series of the waveform patterns. The detection service 216 may maintain information identifying whether each segment of has been identified in the numeric signal within a period of time. In one embodiment, the detection service 216 may implement a segment counter that aggregates the number of segments identified in the numeric signal. The segment counter may be updated (e.g., incremented) only for those segments that have not yet been identified for the current pattern. The detection service 216 may also maintain information identifying the number of complete patterns that have been identified in the numeric signal in a predetermined period of time. If the detection service 216 determines that a predetermined number of the waveform patterns have been identified in the numeric signal, the detection service 216 may provide an indication regarding the occurrence of the series of waveform patterns. In one embodiment, the detection service may implement a segment counter that aggregates the number of segments identified in the numeric signal without counting the number of waveforms. Various criteria for identifying the series of waveform patterns may be stored as a set of rules, such as a set of zone changes that are useable to identify segments of a waveform pattern, a predetermined number of segments that qualify as a waveform pattern, or a predetermined number of waveform patterns that qualify as a series of waveform patterns.

The response service 218 is a computer system configured to perform one or more actions in response to detecting the series of waveform patterns. The response service 218 may, for instance, comprise one or more processors and memory that stores executable instructions whose execution by the one or more processors causes the response service 218 to perform operations described herein. In one embodiment, the response service 218 may include a means for generating an indication that a predetermined waveform pattern was determined to be present in the signal received at the system, and/or a means for causing an action to be performed and remediating a condition in a computer system. The means of the response service 218 may comprise one or more processors and memory coupled to the one or more processors that stores executable instruction whose execution by the one or more processors to perform the operations described herein, as described below with respect to FIG. 6. In one embodiment, the response service 218 may cause one of more actions to be automatically performed to mitigate, prevent, or otherwise remediate potentially adverse effects that may be caused by the series of waveform patterns. The one or more actions may include notifying an authorized user, such as a system administrator or developer, that a predetermined waveform pattern has been detected. The one or more actions may also include modifying one or more aspects of a service provider, such as by rerouting network traffic, adjusting computing resources allocated to the network traffic, or adjusting the bandwidth dedicated to processing to the aspect of the system (e.g., increasing/decreasing bandwidth). In one embodiment, the one or more actions may be related to diagnosing a condition giving rise to the series of waveform patterns, such as by identifying and recording network settings and network traffic information existing for a period of time before the series of waveform patterns began. This may also include communicating with the ISP entity associated with the data stream or streams corresponding to the series of waveform patterns. The response service 218 may employ heuristics or machine-learning techniques to identify the cause of the series of waveform patterns and to determine an appropriate response thereto.

Figure 3:
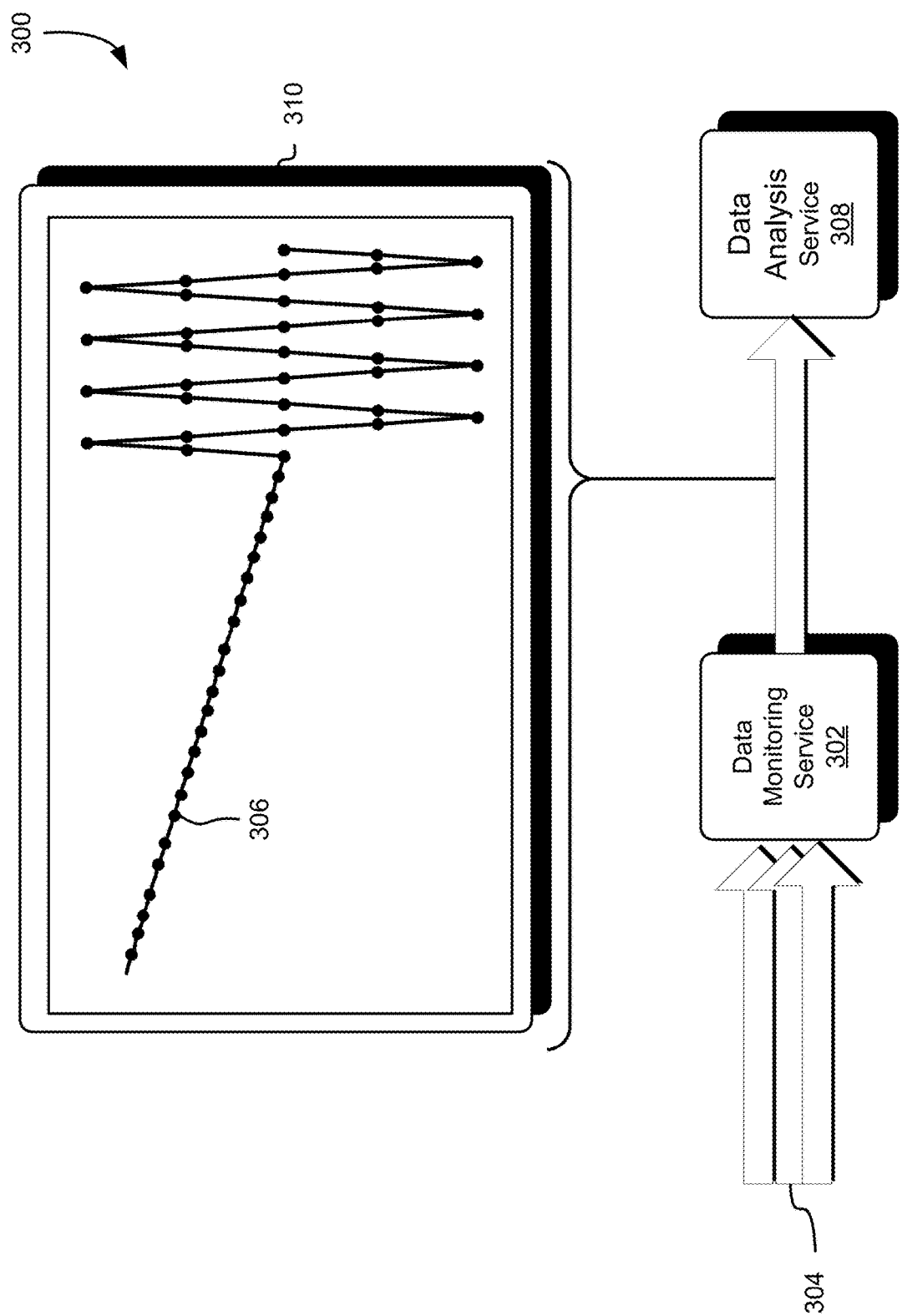
FIG. 3 illustrates a diagram of samples of a signal obtained according to one or more embodiments.

FIG. 3 shows diagram 300 depicting information generated and exchanged between services of the computing resources service provider described above with respect to FIG. 2. The data monitoring service 302 receives one or more signals 304 corresponding to the signals 104, as described above with respect to FIG. 1. The signals 304 may correspond to signals received from one or more systems 106 or may be signals provided by the interfacing service 210 described with respect to FIG. 2. The monitoring service 302 is a computing service configured to monitor the signals 304 and determine or derive information regarding an aspect of the signals 304. For instance, the monitoring service 302 may determine information regarding the data rate of inbound network traffic from an ISP entity. The monitoring service 302 may periodically sample the signals 304 to obtain samples 306 of the data rate over time. Each sample 306 may be a measurement of the data rate (e.g., a measure of the rate of inbound network traffic from the ISP entity) taken at a given instant in time, and adjacent samples 306 may be spaced apart in time based on a sampling rate. The monitoring service 302 may be configured to provide the samples to a data analysis service 308 of the service provider. The monitoring service 302 may sequentially provide the samples 306 to the analysis service 308 as they are obtained, or may provide a plurality of the samples 306 together as a data set to the analysis service. The samples 306 provided to or received at the analysis service 308 may be time-correlated according to the time for which each sample of the data rate was determined. The samples 306, periodically sampled over a period of time, may be depicted as a representation 310 reflecting a trend over time for the aspect of the signals 304.

The samples 306 may be collected in several ways. In one embodiment, samples for a certain time period (e.g., one minute) may be aggregated from multiple interfaces by the monitoring service 302. The samples 306 from the multiple interfaces may be aggregated (e.g., summed, added) over a plurality of the time periods into a single data object having a format usable to distinguish between different sources of the data. Examples of such a format may be a spreadsheet format or delimiter separated data (e.g., sample information separated by delimiter character). In one embodiment, multiple samples from one or more interfaces may be collected for a given time period (e.g., one minute), from which an average for the time period may be calculated. This may increase the accuracy of data collected in some instances. In one embodiment, mathematical operations may be performed on samples collected from signals from one or more of the interfaces. For instance, an error rate for one or more signals may be obtained by dividing the number of errors received in a signal by the amount of traffic for the signal. In these examples, these collections may be performed before evaluating the samples themselves, as described below.

Figure 4:
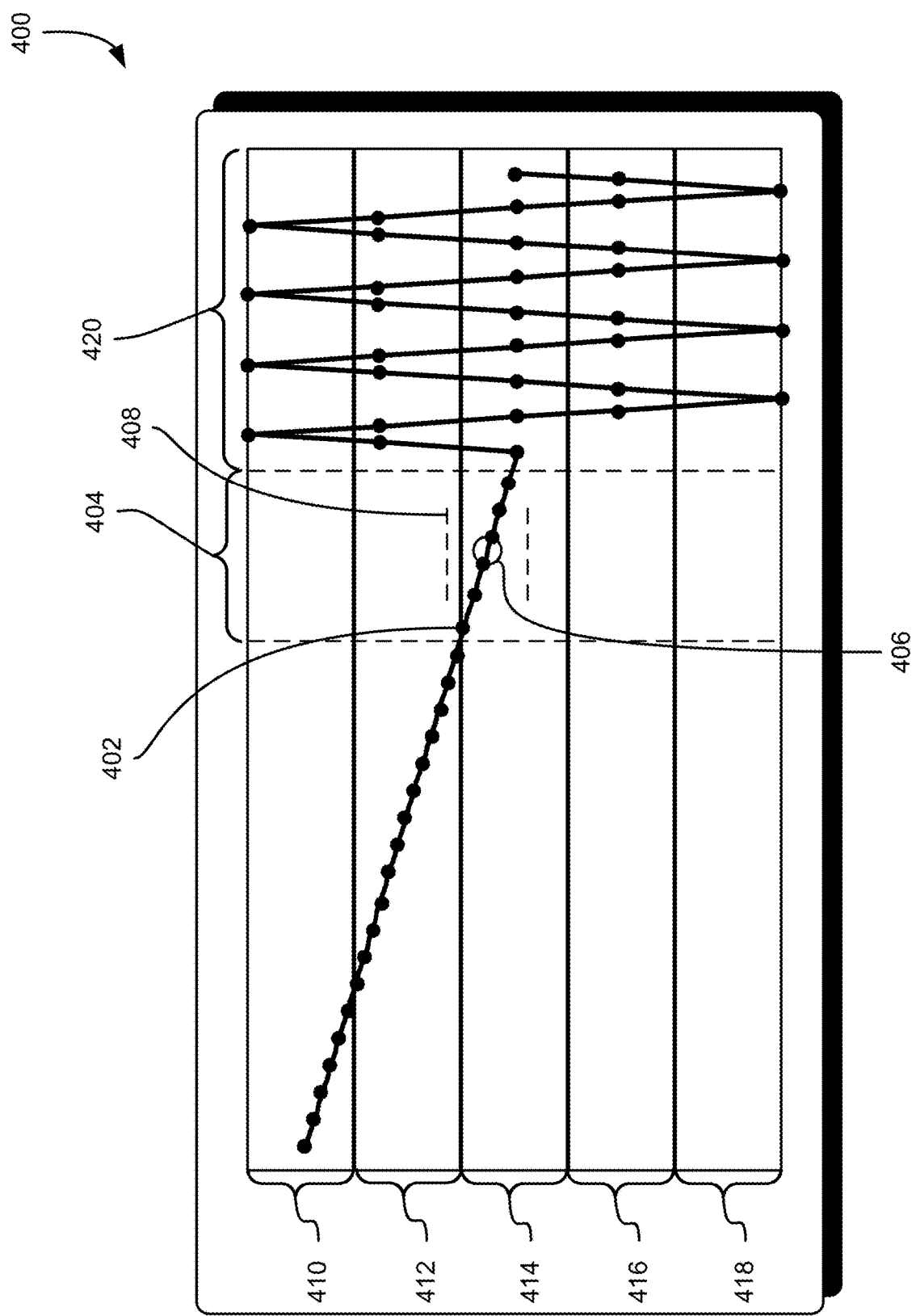
FIG. 4 illustrates a diagram related to determining aspects of a signal according to one or more embodiments.

FIG. 4 shows a diagram 400 illustrating various aspects of an analysis performed by the data analysis service 308 based on the samples 306 provided by the data monitoring service 302. The analysis may include analyzing a plurality of samples 402 to determine one or more mathematical relationships. In particular, the analysis may include, for a period of time 404 including a set of the samples 402, calculating a set of statistical values (e.g., average value 406, standard deviation 408) for the set of samples 402. The period of time 404 may be defined by a preprogrammed setting stored in memory accessible by the analysis service 308. In one embodiment, the period of time 404 may correspond to a number of samples 402 that fit within the period of time 404, as determined by a sampling rate of the monitoring service 302.

The analysis performed by the analysis service 308 may include defining a plurality of numerical zones in which the samples 402 may be located. The plurality of zones may be determined based at least in part on the set of statistical values calculated for the set of samples 402. Each of the zones may be mutually exclusive to the other zones such that an upper numerical boundary for one zone is lower than a lower numerical boundary for a zone immediately adjacent to and above the one zone. Conversely, a lower numerical boundary for one zone is higher than an upper numerical boundary for a zone immediately adjacent to and below the one zone. The plurality of zones defined by the analysis include a high zone 410, a normal zone 414, an intermediate high zone 412 between the high zone 410 and the normal zone 414, a low zone 418, and an intermediate low zone between the low zone 418 and the normal zone 414. The conditions for defining the high zone 410, the intermediate high zone 412, the normal zone 414, the intermediate low zone 416, and the low zone 418 are discussed below in greater detail. After defining the plurality of zones, the analysis service 308 may determine, for each sample 402 provided, in which of the plurality of zones the sample 402 is located and provide an indication of the zone corresponding to the sample 402 to the pattern detection service. As described below, the high zone 410 is unbounded above its lower limit such that it includes all values above its lower boundary, and the low zone 418 is unbounded below its upper limit such that it includes all values below its upper boundary.

Figure 5:
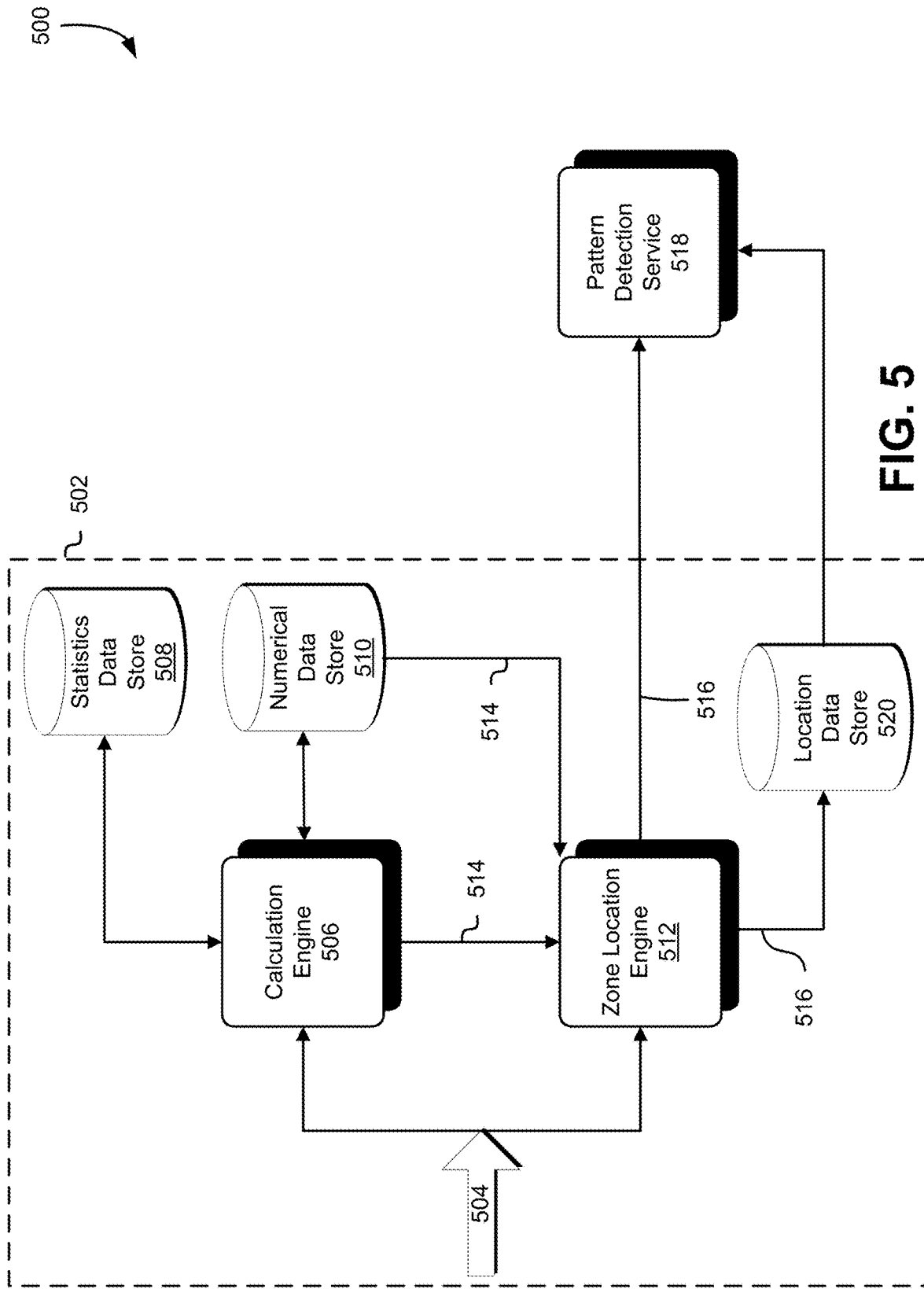
FIG. 5 illustrates a workflow diagram for identifying zones for samples of the signal.

FIG. 5 illustrates a workflow process 500 performed by the data analysis service 502 for determining in which of the plurality of zones a sample is located. The workflow process begins by receiving one or more samples 504 from the data monitoring service, as described above with respect to FIGS. 2, 3, and 4. A calculation engine 506 is a computer system configured to receive a set of samples 504 and calculate a set of values for use in the workflow process. The calculation engine 506 may, for instance, comprise one or more processors and memory that stores executable instructions whose execution by the one or more processors causes the calculation engine 506 to perform operations described herein. The calculation engine 506 may initially accumulate a number of samples 504 sufficient to calculate a set of statistical values for the set of samples. Specifically, the calculation engine 506 may calculate a standard deviation and an average a of the set of samples. For example, the calculation engine 506 may be programmed to calculate an average and a standard deviation of the set of samples based on a predetermined number of samples, or based on a period of time in which a certain number of samples are obtained. The standard deviation may be determined according to a method for calculating standard deviation σ, such as defined by the following Equation (1):

$$\sigma = \sqrt{\frac{\sum |x - \bar{x}|^2}{n}}$$

where x is a value of the sample, $\bar{x}$ is the mean of the set of samples (e.g., the set of samples in the period of time 404), and n is the number of samples in the set of samples. The standard deviation a may be calculated by methods than Equation (1), such as by numerical methods for calculating standard deviation, such as by calculating a rolling standard deviation, or calculating a sample standard deviation. Calculating the average a may be performed using an appropriate method known in the known in the art, such as calculating a simple moving average of a set of samples that may include the set of samples in a fixed period of time (e.g., the period of time 404), or calculating a cumulative moving average corresponding to a set of samples cumulatively obtained over a period of time longer than the period of time 404. The calculation engine 506 may store one or more of the statistical values calculated in a statistics data store 508 in association with a time period and/or information identifying a source of the calculation, such as information identifying the aspect of the data stream. The term "data store", as used herein, refers to any device or combination of devices capable of storing, accessing and retrieving data, which may include any combination and number of data servers, databases, data storage devices and data storage media, in any standard, distributed, virtual or clustered environment.

The calculation engine 506 may also be configured to obtain a set of numerical values used as parameters in association with defining the plurality of zones. The numerical values may be stored in data storage of the system, and may be entered manually or automatically determined based on a mathematical relationship or formula. These numerical values may be used to adjust the sensitivity of the system. One numerical value is a value $k_n$, which may be defined as a normal, non-anomalous value for the given signal. The value $k_n$ may be a value stored in a numerical data store 510, and may be defined by an appropriate entity, such as a system administrator, developer, or other service or engine designated to maintain such a value. The value $k_n$ may be determined by the calculation engine 506 according to another method, such as by determining a median of a set of samples obtained over an appropriate period of time. A second numerical value that the calculation engine may obtain is a value $k_s$, which is an anomalous value determined for the signal. The value $k_s$ may be defined as a multiple of the a statistical value, such as the standard deviation, such as three times the value of the standard deviation σ described above, or may be entered manually or determined automatically by other methods. The value $k_s$ may also be stored in the numerical data store 510.

A zone location engine 512 is a computer system configured to define the plurality of zones using a set of values 514 generated by the calculation engine 506 and/or stored in the numerical data store 510, as described above. The zone location engine 512 may, for instance, comprise one or more processors and memory that stores executable instructions whose execution by the one or more processors causes the zone location engine 512 to perform operations described herein. Specifically, the set of values 514 may comprise the values $k_s$ and $k_n$, the standard deviation σ, and the average a. The zone location engine 512 may obtain the set of values 514 to define the plurality of zones in relation to a value for a sample x, which include a normal zone, a high zone, an intermediate high zone, a low zone, and an intermediate low zone, each corresponding to the zones described above with respect to FIG. 4. The zones are defined by the following relationships:

$x > a + (k_s * \sigma)$  High Zone (HZ):

$a + (k_s * \sigma) \geq x \geq a + (k_n * \sigma)$  Intermediate High Zone (IHZ):

$a + (k_n * \sigma) > x > a - (k_n * \sigma)$  Normal Zone (NZ):

$a - (k_n * \sigma) \geq x \geq a - (k_s * \sigma)$  Intermediate Low Zone (ILZ):

$x < a - (k_s * \sigma)$  Low Zone (LZ):

The zone location engine 512 receives a sample 504 from the data monitoring service and determines in which zone the sample is located. For instance, if a sample 504 has a numerical value satisfying the relationship for the normal zone, the zone location engine 512 will determine that the sample 504 is located in the normal zone 414 depicted in FIG. 4. The location engine 512 may provide information 516 identifying which zone the sample 504 received is located to a pattern detection agent 518. The information 516 may include information useable to identify the sample 504, such as time information identifying when the sample 504 was obtained by the monitoring service (e.g., the time corresponding to the value for the signal). The location engine 512 may also provide the information 516 to a sample location data store 520, which may store the information 516 identifying the zone in association with the identifying information, and may store additional information regarding the sample 504, such as the numerical value of the sample. A set of samples for the aspect of the data stream may be stored in the location data store 520, and each sample may be stored in association with identification information for the respective sample such that each sample may be retrieved or obtained from storage based on when the sample was taken.

Figure 6:
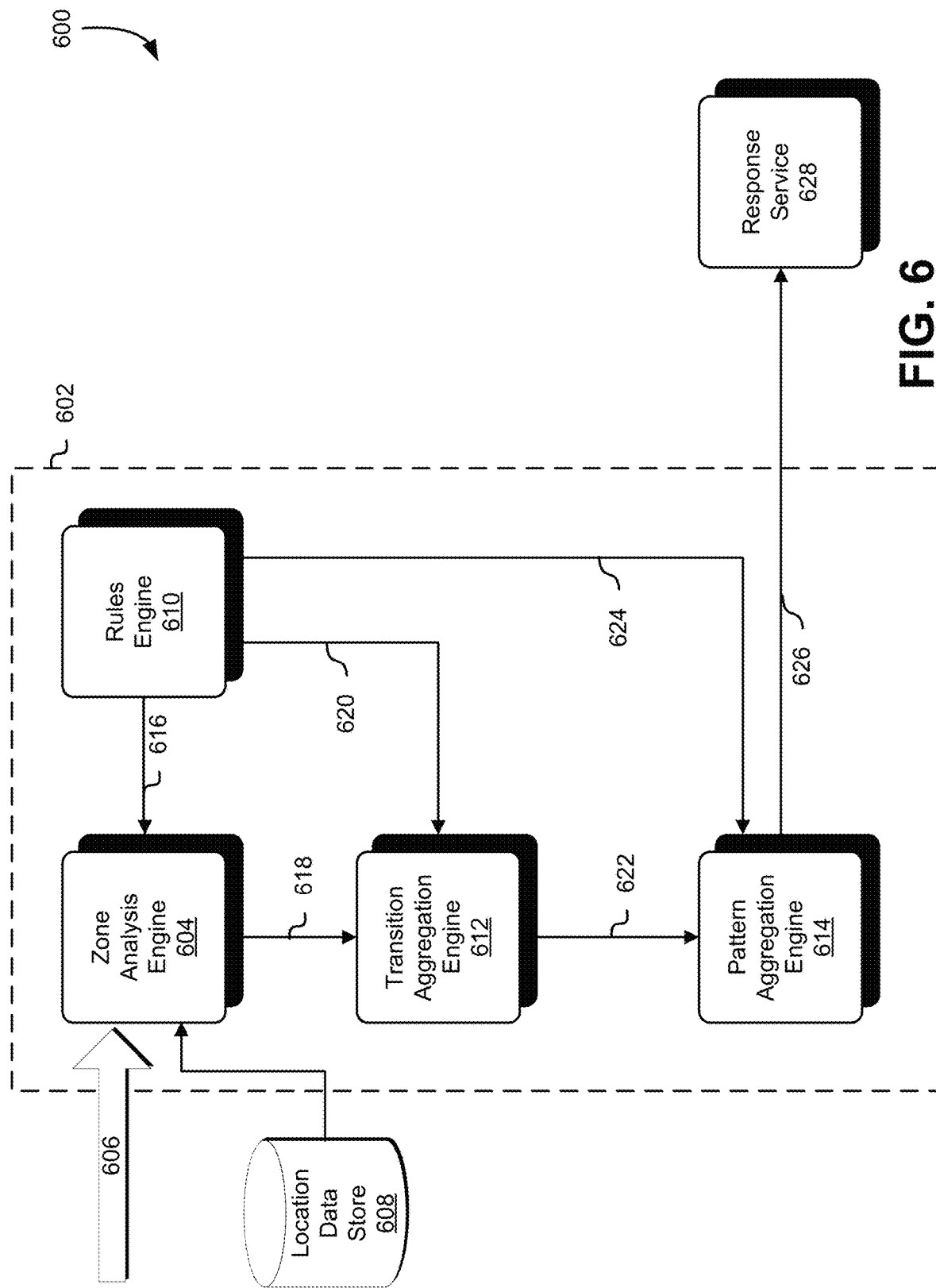
FIG. 6 illustrates a workflow diagram for detecting waveform patterns in the signal.

FIG. 6 illustrates a workflow process 600 performed by a pattern detection service 602 for determining an occurrence of a series of predetermined waveform patterns. A zone analysis engine 604 of the detection service 602 is a computer system configured to perform an analysis to determine whether a change in the signal received is indicative of a predetermined waveform pattern. The zone analysis engine 604 may, for instance, comprise one or more processors and memory that stores executable instructions whose execution by the one or more processors causes the zone analysis engine 604 to perform operations described herein. The analysis engine 604 obtains information 606 from the zone location engine 512 identifying a zone of a current sample. The analysis engine 604 may also obtain, from a location data store 608 corresponding to the location data store described above with respect to FIG. 5, information identifying zones for one or more preceding samples. The analysis engine 604 may compare the current sample with a previous sample to determine a difference between the zones for the current and preceding sample. The difference between the zone for the current sample and the zone for the previous sample may correspond to a transition of the signal from one zone to another. If the zone for the current sample is different than the zone for the preceding sample, the analysis engine 604 identifies the specific transition. For instance, if a zone for the current sample is the normal zone, and the zone for the previous sample is the intermediate high zone, the analysis engine 604 may identify the transition as being a normal-to-intermediate-high-zone transition. The analysis engine 604 may generate information identifying the type of transition. The previous sample obtained for comparison may be obtained based on the sample rate and the predetermined waveform pattern being detected. For example, if the waveform pattern being detected is a waveform that has four segments and that occurs within a given time period, the analysis engine 604 may obtain, based on the sample rate, a number of previous samples that would occur in the timeframe of each of the four segments.

The analysis engine 604 may determine whether a transition identified is a transition that is associated with a predetermined waveform pattern. The analysis engine 604 may obtain a set of predetermined transitions 616 that correspond to segments of the predetermined waveform pattern. The set of predetermined transitions 616 may be stored in memory and/or provided by a rules engine 610. The analysis engine 604 may compare the transition identified with a set of predetermined transitions 616 associated with the predetermined waveform pattern to determine whether the transition identified corresponds to a transition in the predetermined waveform pattern. The set of predetermined transitions 616 may each include a first zone corresponding to the zone of the one or more previous samples and a second zone corresponding to the zone of the current sample.

In one embodiment wherein the predetermined waveform pattern is a spike in the signal having a successive upper peak and/or a lower peak, as shown in FIGS. 3 and 4, the set of predetermined transitions 616 may include a first predetermined transition in which the first zone is a normal zone, intermediate-high zone, or intermediate low-zone; and the second zone is the high zone or the low zone. For instance, the waveform pattern sought to be detected may be a positive spike where the waveform has a peak greater than the normal zone, or a negative spike where the waveform has a trough less than the normal zone. The waveform pattern sought may be a positive spike followed by a negative spike, or a negative spike followed by a positive spike, where the successive spikes occur within a predetermined period of time. In the first predetermined transition for period 420 depicted in FIG. 4, for example, the signal rises or falls precipitously from the NZ 414, the IHZ 412, or the ILZ 416 to the HZ 410 or the LZ 418. The set of predetermined transitions 616 may include a second transition where the first zone is the high zone and the second zone is the normal zone, indicated in the period 420 as being a transition from the HZ 410 to the NZ 414. The set of predetermined transitions 616 may include a third transition where the first zone is the low zone and the second zone is the normal zone, indicated in the period 420 as being a transition from the LZ 418 to the NZ 414. The term "spike" as referred to herein describes a waveform pattern having an anomalous increase and/or decrease in amplitude having a distinct peak and/or trough. The "spike" may be a waveform having a steep slope on both sides of a peak or trough value, for example.

Figure 9:
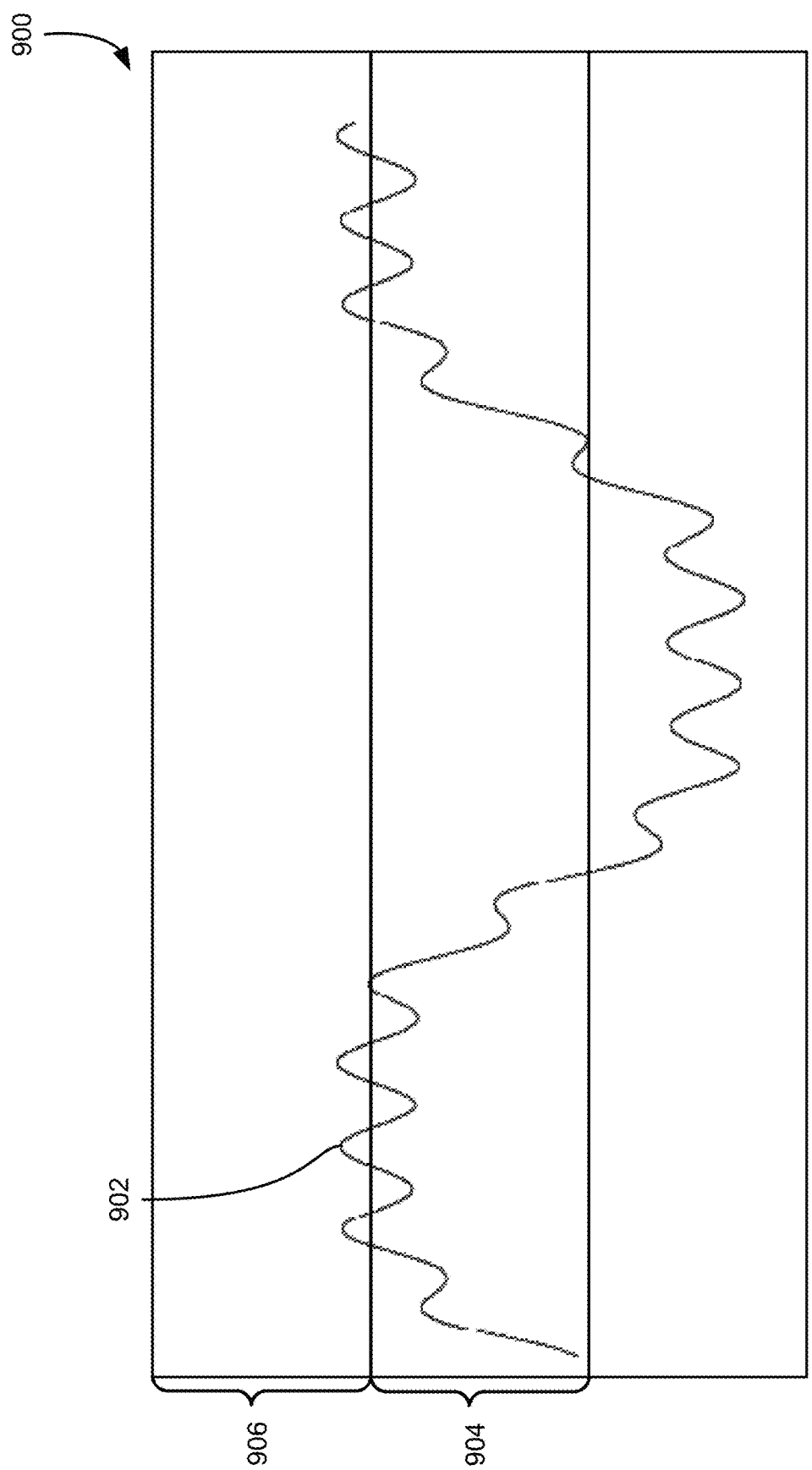
FIG. 9 illustrates a diagram related to determining aspects of a signal according to one or more embodiments.

Conclusion of intermediate zones (i.e., IHZ 412, ILZ 416) allows the system to distinguish signals having signal values oscillating between adjacent zones, and a "spike" signal. FIG. 9 illustrates a diagram 900 of a signal 902 received having values oscillating between a first zone 904 and a second zone 906 higher than the first zone 904. Although the signal 902 travels between the first zone 904 and the second zone 906 repeatedly, detecting the oscillations as "spikes" would be false positives. Accordingly, the intermediate zones 412 and 416 are introduced to distinguish between signals which might produce false positives, and waveform patterns sought to be detected, such as "spikes."

The analysis engine 604 may provide information 618 to an instance aggregation engine 612 indicating whether a signal transition corresponding to a segment of the predetermined waveform pattern has been detected based on the results of the comparison. In response to determining that the transition of the signal corresponds to one of the set of predetermined transitions 616, the analysis engine 604 may provide information 618 positively indicating detection of one of the predetermined transitions 616. The information 618 may include information identifying which of the first transition, second transition, or the third transition was detected. For instance, the information 618 may indicate that a segment of a positive spike was detected (e.g., upward spike in signal), such as by indicating that a transition from a normal zone to a high zone was detected. The information 618 may indicate that a segment of a negative spike was detected (e.g., downward spike in signal), such as by indicating that a transition from a normal zone to a low zone was detected. Conversely, in response to determining that the transition of the signal does not correspond to one of the set of predetermined transitions 616, the analysis engine 604 may provide information 618 indicating that one of the predetermined transitions 616 was not detected in the signal.

The transition aggregation engine 612 is a computer system configured to aggregate the instances of signal transitions corresponding to the set of predetermined transitions 616. The transition aggregation engine 612 may, for instance, comprise one or more processors and memory that stores executable instructions whose execution by the one or more processors causes the transition aggregation engine 612 to perform operations described herein. The transition aggregation engine 612 may implement a counter that counts the number of instances of information 618 positively indicating detection of one of the predetermined transitions 616 received from the analysis engine 604. The transition aggregation engine 612 may receive a set of rules 620 from the rules engine 610 defining conditions for updating the counter. The rules engine 610 may, for instance, comprise one or more processors and memory that stores executable instructions whose execution by the one or more processors causes the rules engine 610 to perform operations described herein. The set of rules 620 may specify that the counter should be incremented for each instance of information 618 positively indicating the detection of one of the predetermined transitions 616. The set of rules 620 may specify that the counter will be reset to an initial value in response to receiving information 618 indicating that one of the predetermined transitions 618 was not detected in signal. The set of rules 620 may also define a threshold value for the counter that, if reached or exceeded, is indicative of the occurrence of the predetermined waveform pattern. For example, the threshold may be set to three such that if the first predetermined transition is detected twice (e.g., transition from NZ 414 to HZ 410 and transition from NZ 414 to LZ 418), the second predetermined transition is detected once (e.g., transition from HZ 410 to NZ 414), and the third predetermined transition is detected once (e.g., transition from LZ 418 to NZ 414), the transition aggregation engine 612 will increment the counter four times, causing the value of the counter to exceed the threshold value.

The transition aggregation engine 612 may provide information 622 to a pattern aggregation engine 614 indicating whether the predetermined waveform pattern was detected. If the counter exceeds or reaches the threshold value, the transition aggregation engine 612 may provide information 622 positively indicating detection of the predetermined waveform pattern. If the counter maintained by the transition aggregation engine 612 is reset, the transition aggregation engine 612 may provide information 622 indicating to the pattern aggregation engine 614 that the predetermined waveform was not detected. In some instances, the transition aggregation engine 612 may not provide the information 622 to the pattern aggregation engine 614—for example, when the counter is updated (e.g., incremented) or the current state of the counter is maintained.

The set of rules 620 may specify other rules in which the counter maintained by the transition aggregation engine 612 is not reset in response to receiving information 618 indicating that one of the predetermined transitions 618 was not detected in signal. In one embodiment, the set of predetermined transitions 616 may include one or more predetermined other transitions that the analysis engine 604 may identify. The other transitions may include a fourth transition wherein the first zone corresponds to the high zone in the second zone corresponds to the intermediate high zone, and a fifth transition wherein the first zone corresponds to the low zone and a second zone corresponds to the intermediate low zone. The other transitions correspond to the case in which after the signal is in the high zone and low zone, multiple time intervals may be required for the signal to recover. These other transitions may create a history system that prevents certain forms of steps or spikes as being detected as multiple peaks. In response to detecting the fourth transition or the fifth transition, the analysis engine 604 may provide information 618 indicating the detection of the fourth or the fifth transition. The set of rules 620 may include one or more rules causing the transition aggregation and 612, in response to receiving information indicating the detection of the occurrence of the fourth or fifth transition, to maintain a current state of the counter instead of updating or resetting the counter. In such an event, the transition aggregation engine 612 may provide information 622 indicating that the fourth or the fifth transition was detected, or may not provide the information 622 in response to receiving information 618 indicating the detection of the fourth or fifth transition.

The pattern aggregation engine 614 is a computer system configured to aggregate instances of the detection of the predetermined waveform pattern. The pattern aggregation engine 614 may, for instance, comprise one or more processors and memory that stores executable instructions whose execution by the one or more processors causes the pattern aggregation engine 614 to perform operations described herein. In one embodiment, the pattern aggregation engine 614 may implement a second counter that counts the number of instances of information 622 indicating that the predetermined waveform pattern has been detected. The pattern aggregation engine 614 may receive a second set of rules 624 from the rules engine 610 specifying that the second counter should be incremented for each instance of information 622 positively indicating the detection of a predetermined waveform pattern. The second set of rules 624 may specify that the second counter should be reset in response to receiving information 622 indicating that the predetermined waveform pattern was not detected. The second set of rules 624 may include a second threshold value for the second counter that, if exceeded or reached, positively indicates the detection of a predetermined number of successive occurrences of the predetermined waveform pattern. The predetermined number of successive occurrences of waveform patterns may be identified as being correlated with a problem detected in the service provider 202. In response to detecting the predetermined number of successive occurrences of waveform patterns, the pattern aggregation engine 614 may provide information 626 positively indicating the detection to a response service 628.

The response service 628 is a computer system configured to provide a response to the detection of the predetermined number of successive occurrences of waveform patterns. In one embodiment, the response may include performing one or more actions to remediate, mitigate, or prevent the potential adverse effects caused by the series of waveform patterns, such as by rerouting network traffic, adjusting computing resources allocated to the network traffic, or adjusting the bandwidth dedicated to processing to the aspect of the service provider. In one embodiment, the response may include providing a notification to an authorized user that a waveform pattern or series of waveform patterns was detected. In one embodiment, the response may include causing actions to be performed for diagnosing a condition giving rise to the series of waveform patterns, such as by identifying and recording network settings and network traffic information existing for a period of time before the series of waveform patterns began. This may also include communicating with an internet service provider entity to exchange data and/or coordinate to diagnose the cause of the anomalous series of waveform patterns. The response service 628 employs heuristics or machine learning techniques are done by the cause of the series of waveform patterns and to determine an appropriate response thereto. Accordingly, contemporaneous detection of the occurrence of the anomalous series of waveform patterns may enable the service provider to remediate, mitigate, or prevent adverse effects caused thereby.

Figure 7:
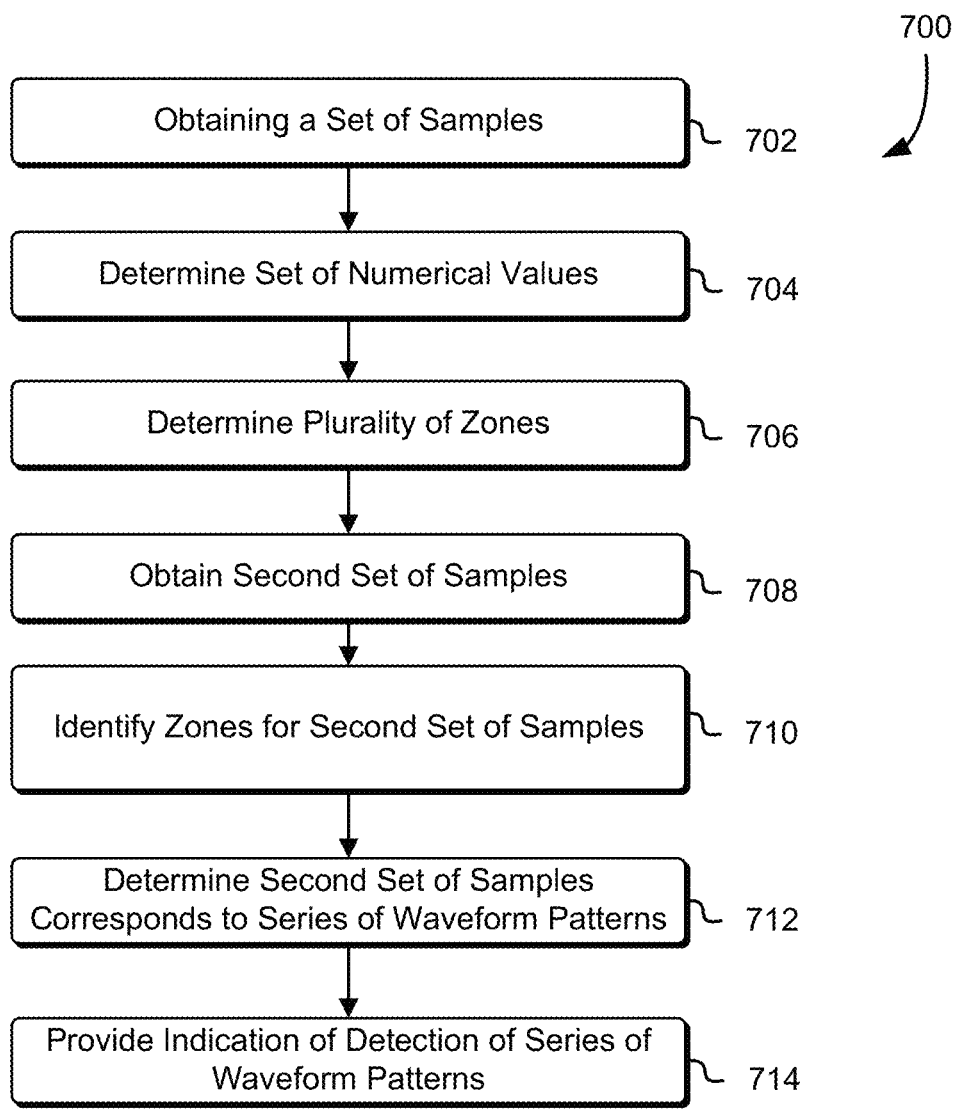
FIG. 7 illustrates a process for detecting waveform patterns in the signal.

FIG. 7 shows an illustrative process 700 for detecting an anomalous series of waveform patterns in a signal. The process 700 may be performed by the data monitoring service, the data analysis service, the pattern detection service, and the response service described above with respect to FIGS. 2, 3, 4, 5, and 6. The process 700 begins by the data monitoring service obtaining 702 a set of samples of a signal received at a system, as described above with respect to FIG. 3. Next, the data analysis service determines 704 a set of values, such as the standard deviation, the average, and the numerical values $k_s$ and $k_n$ described above. The data analysis service then determines 706 a plurality of zones based on the set of numerical values determined in step 704, as described above with respect to FIG. 5. The data monitoring service may obtain 708 a second set of samples after the set of samples. The data analysis service may then identify 710 zones for each sample in the second set of samples, as described above with respect to FIG. 5. The pattern detection service may determine 712 that the second set of samples corresponds to a series of waveform patterns, as described above with respect to FIG. 6. The determination 712 may be based on a set of transitions between samples in the second set of samples corresponding to one or more of a set of predetermined transitions indicated as being transitions in an anomalous series of waveforms. The pattern detection service may then provide 714 an indication to the response service that the anomalous series of waveforms was detected in the signal received, as described above with respect to FIGS. 2 and 6.

Figure 8:
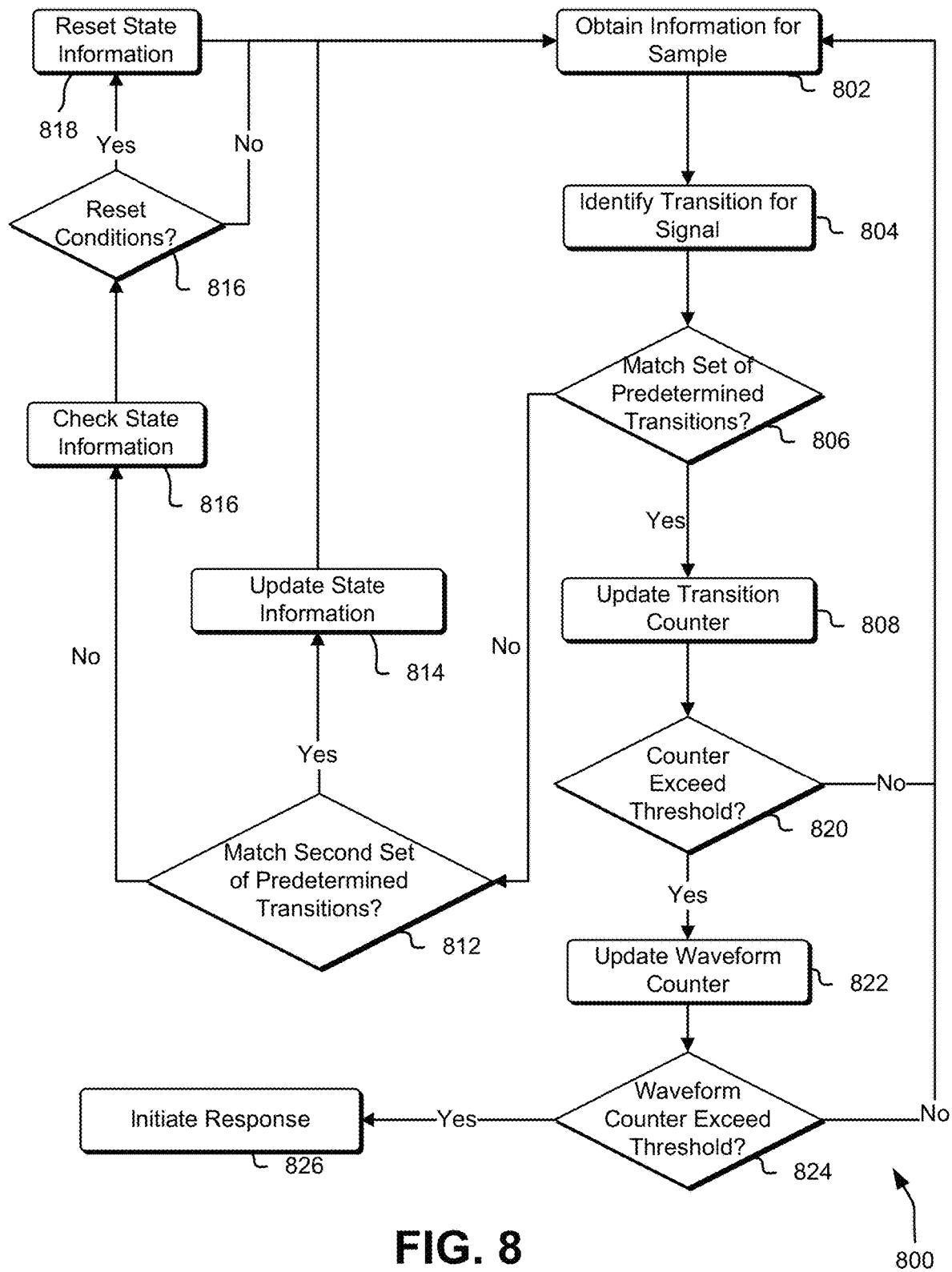
FIG. 8 illustrates a process for aggregating instances of predetermined transitions of the signal between zones.

FIG. 8 shows an illustrative process 800 for determining whether a set of samples corresponds to a series of waveform patterns. The process 800 may be performed by the pattern detection service described above with respect to FIG. 5. The detection service begins the process 800 by obtaining information for a sample of the signal. The sample may be the most recent or current sample obtained, or may be the next sample in a queue. The information may include information identifying which of the zones (as described with respect to FIGS. 4 and 5) the sample is associated with. Next, the detection service may identify 804 a transition of the signal based on the sample. In particular, the detection service may identify a zone for previous value of the signal, in determining the transition from the previous value to the value for the current sample. The detection service then determines 806 whether the transition for the signal matches one of the set of predetermined transitions 616 discussed above with respect to FIG. 6. If the transition matches one of the set of predetermined transitions 616, the detection service updates 808 (e.g., increments) a transition counter associated with the predetermined transitions. Updating the transition counter may include resetting a second transition counter discussed below. The counter associated with the set of predetermined transitions corresponds to state information for the system, as described below.

If the transition is not a match to one of the set of predetermined transitions 616, the detection service determines 812 whether the transition matches one of the second set of predetermined transitions. In particular, the detection service may determine whether the transition matches the fourth transition (i.e., transition from high zone to intermediate-high zone) or fifth transition (i.e., transition from low zone to intermediate-low zone) discussed above with respect to FIG. 6. If the detection service determines that the transition matches one of the second set of predetermined transitions, the detection service may update 814 state information associated with the system, such as by indicating that the system may be in a transition to an intermediate zone from an adjacent high or low zone. The second counter may account for a hysteresis in the system for which it takes the signal a certain period of time from which to recover.

Figure 10:
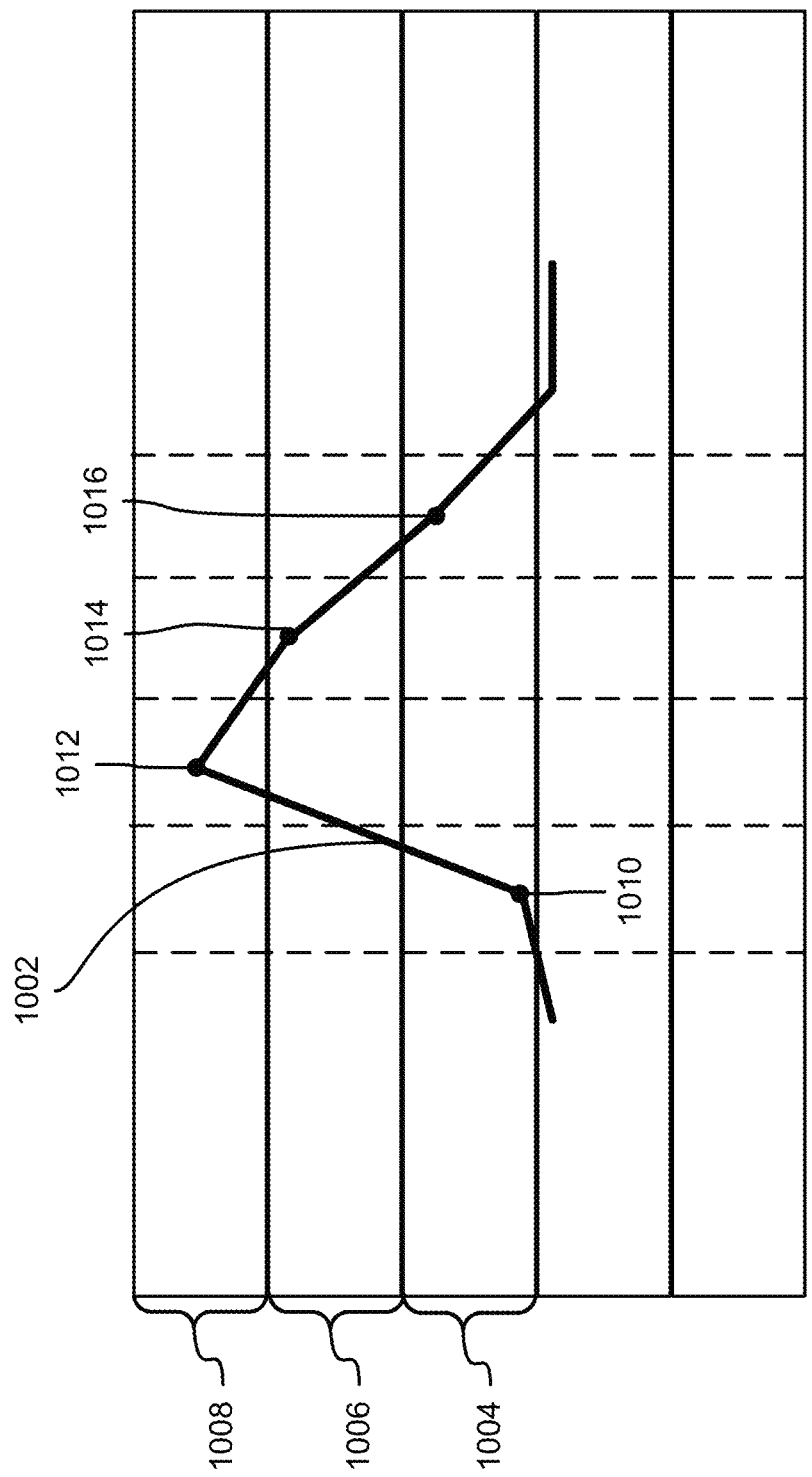
FIG. 10 illustrates a diagram related to determining aspects of a signal according to one or more embodiments.

FIG. 10 shows a diagram 1000 for detecting lag or hysteresis in a signal 1002, as described herein. The signal 1002 passes through a normal zone 1004, an intermediate-high zone 1006, and a high zone 1008. In particular, a first sample 1010 of the signal 1002 taken in a first time period is located in the normal zone 1004, and a second sample 1012 of the signal 1002 taken in a second time period is located in the high zone 1008. Thereafter, a third sample 1014 of the signal taken in a third time period is located in the intermediate-high zone 1006, and a fourth sample 1016 is located in the normal zone 1004. The signal 1002 requires one or more time periods to return to the normal zone 1004 from the high zone 1008. According to one embodiment described herein, the signal 1002 corresponds to a waveform pattern sought to be detected (e.g., a spike) even though the signal 1002 has a sample 1014 located in the intermediate-high zone 1014. The step of determining whether a set of samples matches a second set of predetermined transitions allows the system to detect these transitions to the normal zone from a high or low zone. Accordingly, providing the system multiple sample periods in which to recover allows the system to detect multiple spikes more accurately. After detecting a transition corresponding to the second set of transitions, the process may return to obtain 802 information for a next sample.

Returning to step 812, if the transition for the signal does not match one of the second set of predetermined transitions, the detection service determines that the predetermined waveform pattern is not detected and checks 816 state information associated with the system. For instance, the state information may include an indication that the signal is in a transition matching the second set of transitions, an indication that a waveform was recently detected (e.g, the waveform counter has been incremented). The system may then determine 816 whether the state information matches a condition for resetting state information. For instance, the system may determine that the signal is oscillating in a manner similar to the diagram 900 (e.g., did not return to normal zone from intermediate zone), that a spike has not been detected in a period of time exceeding a predetermined period of time for detecting the waveform pattern. If the state information matches the condition, the process may reset 818 the state information, corresponding to a determination that recent signal activity does not correspond to the waveform pattern being sought for detection. Although the state information may be reset, the information associated with the signal (e.g., time information, sample values) may be stored in data storage for future analysis.

Returning to step 808, after updating the transition counter, the detection service determines 820 whether the transition counter exceeds a first predetermined threshold value associated with the transition counter. The first predetermined threshold value may be a threshold maintained by the rules engine 610. If the transition counter does not exceed the first predetermined threshold value, then the detection service may return to step 802 to obtain information for the next sample. If the transition countered exceeds the first predetermined threshold value, then the detection service may update 822 (e.g., increment) a waveform counter associated with maintaining a count for a number of waveform patterns that have been successfully counted or identified. Updating 822 the waveform counter may include resetting the transition counter and the second transition counter to an initial value. The detection service then determines 824 whether the waveform counter exceeds a predetermined waveform threshold value corresponding to a number of successive waveform patterns that qualify as an anomalous condition to be detected. If so, the process 800 may proceed to initiating 826 a response by the response service 218 in a manner as described above. The predetermined waveform threshold value may be maintained and/or provided by the rules engine 610 described above with respect to FIG. 6. If the waveform counter does not exceed the predetermined waveform threshold value, then the detection service may return to step 802 to obtain information for the next sample.

Figure 11:
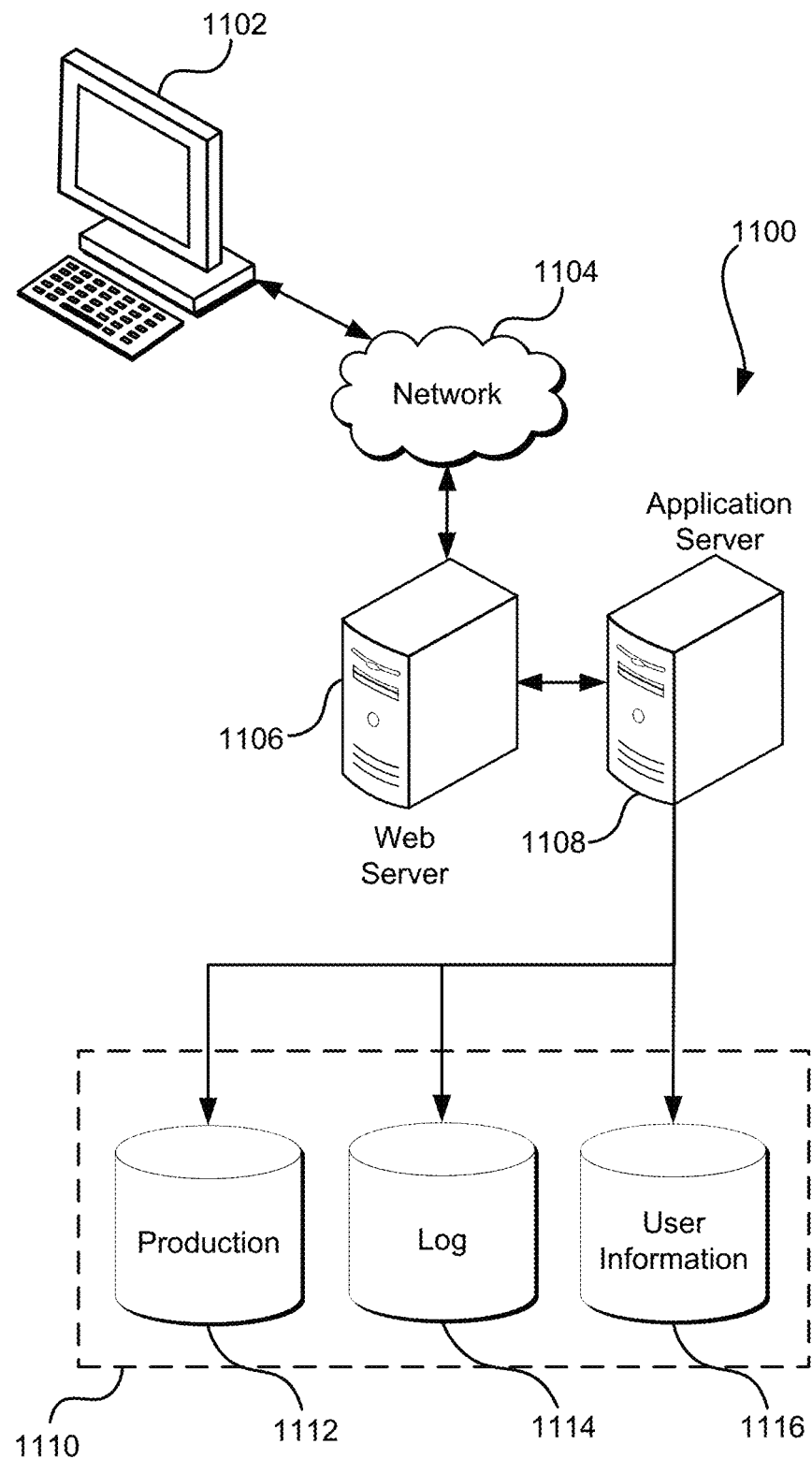
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of zones of values herein are merely intended to serve as a shorthand method of referring individually to each separate value falling within the zone, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method for identifying patterns in a signal received at a computer network system, the method comprising:
   obtaining a set of samples of the signal;
   determining a standard deviation and an average of the signal;
   identifying a plurality of zones for the signal, one or more of the plurality of zones corresponding to normal values for the signal, and one or more of the plurality of zones corresponding to abnormal values for the signal, the plurality of zones being identified based on the standard deviation and the average of the signal;
   identifying a first zone of the plurality of zones associated with a first sample of the signal and a second zone of the plurality of zones associated with a second sample of the signal;

updating a counter based on whether a difference between the first zone and the second zone corresponds to a predetermined transition in the signal;

determining that the counter exceeds a predetermined threshold, the predetermined threshold being indicative of the signal corresponding to a predetermined waveform pattern; and causing remediation of a condition in the computer network system based on the counter exceeding the predetermined threshold.

2. The computer-implemented method of claim 1, wherein the signal comprises a communication signal received by the computer network system, and the set of samples indicate a rate of change for a resource used in communicating over a network.

3. The computer-implemented method of claim 1, the method further comprising:

resetting the counter based on a determination that the difference between the first zone and the second zone does not correspond to the predetermined transition.

4. The computer-implemented method of claim 1, wherein the predetermined waveform pattern is a series of spikes in the signal.

5. A system, comprising:

a means for determining a set of statistical values based on a first set of samples of a signal received at the system;

a means for determining a plurality of zones for the signal based on the set of statistical values;

a means for identifying a set of zone locations in the plurality of zones for a second set of samples of the signal;

a means for determining that the set of zone locations correspond to a plurality of predetermined transitions for detecting a predetermined waveform pattern in the signal; and a means for generating an indication that the predetermined waveform pattern was determined to be present in the signal.

6. The system of claim 5, further including:

a means for determining a second set of zone locations in a plurality of zones of a third set of samples of the signal; and a means for determining that the second set of zone locations correspond to the plurality of predetermined transitions.

7. The system of claim 6, further including:

a means for generating an indication that a series of waveform patterns was determined to be present based on the correspondence of the set of zone locations and the second set of zone locations to the plurality of predetermined transitions.

8. The system of claim 5, wherein the predetermined transitions correspond to segments of successive spikes in the signal, the successive spikes including a plurality of spikes having a maximum or minimum value exceeding a normal range for the signal.

9. The system of claim 5, wherein the statistical values comprise a standard deviation of the signal and an average of the signal.

10. The system of claim 5, wherein the plurality of zones comprises a normal zone, a high zone, an intermediate-high zone between the normal zone and the high zone, a low zone, and an intermediate-low zone between the normal zone and the low zone.

11. The system of claim 10, wherein the plurality of predetermined transitions include:

a first predetermined transition from one of the normal zone, the intermediate-high zone, or the intermediate-low zone to the low zone or the high zone;

a second predetermined transition from the high zone to the normal zone; and a third predetermined transition from the low zone to the normal zone.

12. The system of claim 11, wherein detecting the predetermined waveform pattern in the signal includes determining that the set of zone locations correspond to a set of transitions in the signal matching the first predetermined transition, the second predetermined transition, and the third predetermined transition.

13. A non-transitory computer-readable storage medium having stored thereon executable instructions that, as a result of being executed by one or more processors of a computer system, cause the computer system to at least:

determine a set of statistical values of a signal received at the system;

determine a plurality of zones for the signal based on the set of statistical values;

identify zone locations for a plurality of samples of the signal, the zone locations each corresponding to one of the plurality of zones;

determine whether a plurality of the zone locations correspond to a plurality of predetermined transitions for detecting a predetermined waveform pattern in the signal; and generate an indication that the predetermined waveform pattern is detected in the signal.

14. The non-transitory computer-readable storage medium of claim 13, wherein the instructions further comprise instructions that, as a result of being executed by the one or more processors, cause the computer system to:

maintain a counter corresponding to a number of consecutive predetermined waveform patterns detected in the signal; and cause an action to be performed in response to determining that the count exceeds a predetermined threshold.

15. The non-transitory computer-readable storage medium of claim 14, wherein the predetermined waveform pattern includes a spike having a maximum or minimum value exceeding a normal range for the signal.

16. The non-transitory computer-readable storage medium of claim 13, wherein the plurality of zones are determined based on an anomalous value determined for the signal, and a normal value determined for the signal.

17. The non-transitory computer-readable storage medium of claim 13, wherein the plurality of zones include a normal zone, a high zone, an intermediate-high zone between the normal zone and the high zone, a low zone, and an intermediate-low zone between the normal zone and the low zone, and wherein the plurality of predetermined transitions include transitions between non-adjacent zones of the plurality of zones.

18. The non-transitory computer-readable storage medium of claim 13, wherein the instructions further cause the one or more processors to:

update a counter associated with detection of the predetermined waveform pattern based on detection of one of the predetermined transitions, wherein the indication that the predetermined waveform pattern is detected is based on the counter exceeding a predetermined threshold.

19. The non-transitory computer-readable storage medium of claim 18, wherein the instructions further cause the one or more processors to:

maintain a current state of the counter based on detecting one of a plurality of second predetermined transitions in the signal.

20. The non-transitory computer-readable storage medium of claim 19, wherein the instructions further cause the one or more processors to:
update a state of the computer system based on a determination that the plurality of zone locations do not correspond to the plurality of predetermined transitions or the plurality of second predetermined transitions.

* * * * *